United States Patent [19]

Okayama et al.

[11] Patent Number: 4,902,892

[45] Date of Patent: Feb. 20, 1990

[54] METHOD OF MEASUREMENT BY SCANNING TUNNELING MICROSCOPE

[75] Inventors: Shigeo Okayama; Hiroshi Tokumoto; Hiroshi Bando; Wataru Mizutani, all of Ibaragi; Masayuki Shimura; Haruki Nakagawa, both of Saitama; Masatsugu Shigeno; Kazutoshi Watanabe, both of Tokyo, all of Japan

[73] Assignees: Agency of Industrial Science and Technology, Kosaka Laboratory Ltd.; Seiko Instruments Inc., both of Tokyo, Japan

[21] Appl. No.: 257,468

[22] Filed: Oct. 13, 1988

[30] Foreign Application Priority Data

Oct. 15, 1987 [JP]  Japan .................. 62-260612

[51] Int. Cl.$^4$ ............................. H01J 37/26
[52] U.S. Cl. .................... 250/307; 250/306
[58] Field of Search ............... 250/306, 307

[56] References Cited

U.S. PATENT DOCUMENTS 4,814,622  3/1989  Gregory et al. .................. 250/306

OTHER PUBLICATIONS

Pohl et al., Rev. Sci. Instrum. 59(6), Jun. 1988, pp. 840-842.

Primary Examiner—Jack I. Berman
Attorney, Agent, or Firm—Bruce L. Adams; Van C. Wilks

[57] ABSTRACT

A probe is shifted at a distance where the probe and a material to be observed are sufficiently far away from each other relative to the roughness of the material's surface. This method prevents the probe from colliding with the material's surface during the shift of the probe thereby enabling high speed shift of the probe. Further, a micro-drive mechanism for controlling tunnel currents may be stopped during the shift in order to minimize the drift which may be caused by heat generated inside the micro-drive mechanism. Therefore, it is particularly advantageous to apply this STM measuring method for high-speed and stable measurement of a very large surface area and a very rough surface.

10 Claims, 3 Drawing Sheets

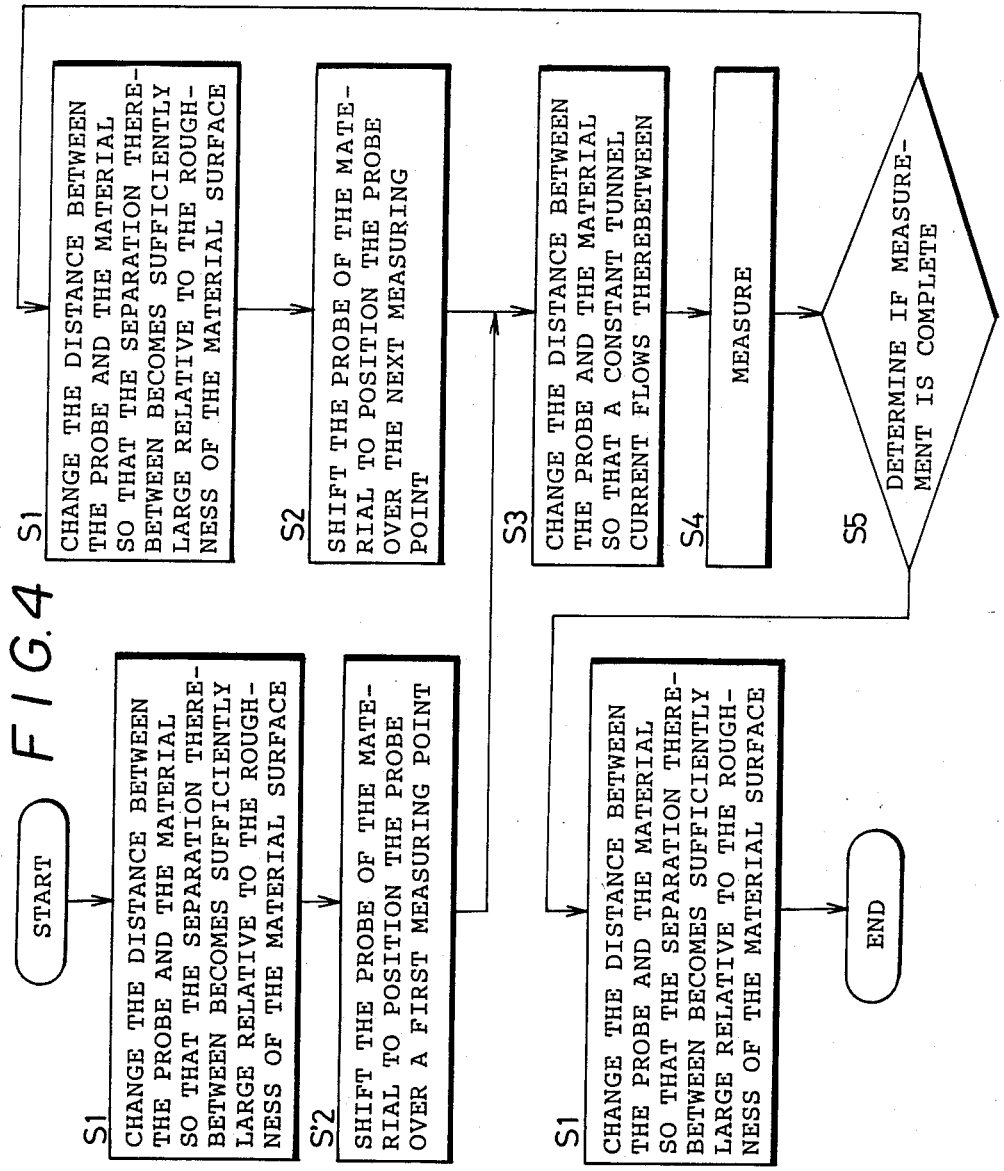

METHOD OF MEASUREMENT BY SCANNING TUNNELING MICROSCOPE

BACKGROUND OF THE INVENTION

The present invention relates to a method of measurement using tunnel currents flowing between a probe and a material to be observed. More particularly, this invention relates to a method of measurement of surface topographys by a scanning tunneling microscope (hereinafter referred to as STM) for a large surface area and a very rough surface.

In the measurement of micro-structures of a material surface by the STM, a detection probe is brought close to the surface of the material, the separation between the detection probe and the material surface is controlled to maintain a constant tunnel current which flows by the application of a voltage between the detection probe and the material, and the detection probe is shifted across the material surface. This is utilized for various material observations ranging from the observation of atoms in a square on the order of several ten Å to the observation of material structures in a square on the order of several $\mu$m.

In such measurements, the separation at which a tunnel current flows is kept at a constant value, and the material surface is scanned across with a detection probe. ("Atomic images and electronic states observed by Tunneling Scanning Microscopes", Japan Physics Association Journal Vol. 42, No. 3 (1987) by Kouji Kajimura: "1st Application of STM" Summary of 34th Applied Physics Association public lecture (1987) by Takafumi Kojio.)

A conventional measuring method by the STM is hereunder described with reference to FIG. 2. Let us assume that X is a direction of scanning across the surface of a material 2, Y is a direction parallel with the surface and perpendicular to the direction X, ad X is a direction perpendicular to the surface. When a detection probe 1 is brought close to the material 2 in the direction Z with a voltage being applied therebetween, a tunnel current starts flowing at a certain separation. While the separation between the detection probe 1 and the material 2 is controlled to maintain this tunnel current at constant, the material surface is scanned across. Based on displacements of the detection probe 1 in the direction Z at measuring points, a three-dimensional image of the material surface is produced. In this case, the detection probe 1 has to be moved below a speed to which a Z-axis servo amplifier and a Z-axis PZT of the STM apparatus can sufficiently and stably respond. Therefore this method presents the problem that it takes a long time to scan across a very large surface area and a very rough surface. Furthermore, scanning operation at high speed increases the risk of collision of the detection probe with the material surface, and increases drift due to the internal heat generation, thereby stable measurements are prevented.

Conventional measuring methods by using the STM have the following problems.

(1) Since the detection probe is moved along the roughness of atoms of a material surface, the followability of the micro-drive mechanism in the direction Z determines its scanning speed in the directions X and Y. Since the resonance frequency of the current micro-drive mechanism is about several KHz, the scanning speed is limited to about several hundred Angstrom/sec. Therefore it takes an unrealistically long time to scan across a large surface which exceeds a several micron meter square.

(2) There are cases in which the detection probe collides with the material surface if an extremely rough surface is scanned across at a speed as described in case (1) above. In order to prevent the detection probe from colliding with the material surface, scanning must be carried out at a lower speed. Therefore scanning across a large and rough surface area is far more impractical than that in the case (1) above.

(3) Since the micro-drive mechanism is driven at high speed even at places other than the measuring points during scanning by the STM, the micro-drive mechanism generates considerable heat, and consequently this results in thermal expansion of the micro-drive mechanism, change in the piezoelectric coefficient, and unstableness in the measurement. Summary of the Invention It is an object of the invention to provide an improved method of measurement by a scanning tunneling microscope for a large surface area and a very rough surface of a specimen at high speed.

Other and further objects, features and advantages of the invention will appear more fully from the following description.

In this invention, when the measurement is not carried out, the detection prove is separated from the material surface sufficiently far in comparison with the roughness of the material surface, and the operation of the micro-drive mechanism in the direction toward the material surface is stopped.

Because of this feature, the probe can be shifted from one measuring point to another at high seed, and therefore high-speed and stable measurement by the STM become possible.

(1) Since the separation between the detection probe and the material is made sufficiently large relative to the roughness of the material surface at places other than the measuring points, the problem of followability in the direction Z is eliminated, and measurement of a large surface area at high speed becomes possible without collision of the detection probe with the material surface.

(2) Measurement of a very rough surface at high speed is even possible without the detection probe colliding with the material surface, since the separation between the detection probe and the material surface is made sufficiently large in comparison with the roughness of the material surface.

(3) Operation of the micro-drive mechanism in the direction of the Z-axis can be stopped at places other than the measuring points, and the micro-drive mechanism is vertically driven only once at each measuring point, thereby the drift which may be caused by heat generated in the micro-drive mechanism is reduced.

BRIEF DESCRIPTION OF DRAWINGS

FIG. 4 is a flowchart of the measurement operation by the STM apparatus according to the present invention.

DETAILED DESCRIPTION

The invention relates to a measurement by the STM, and one embodiment is described below with reference to the accompanying drawings.

Figure 1:
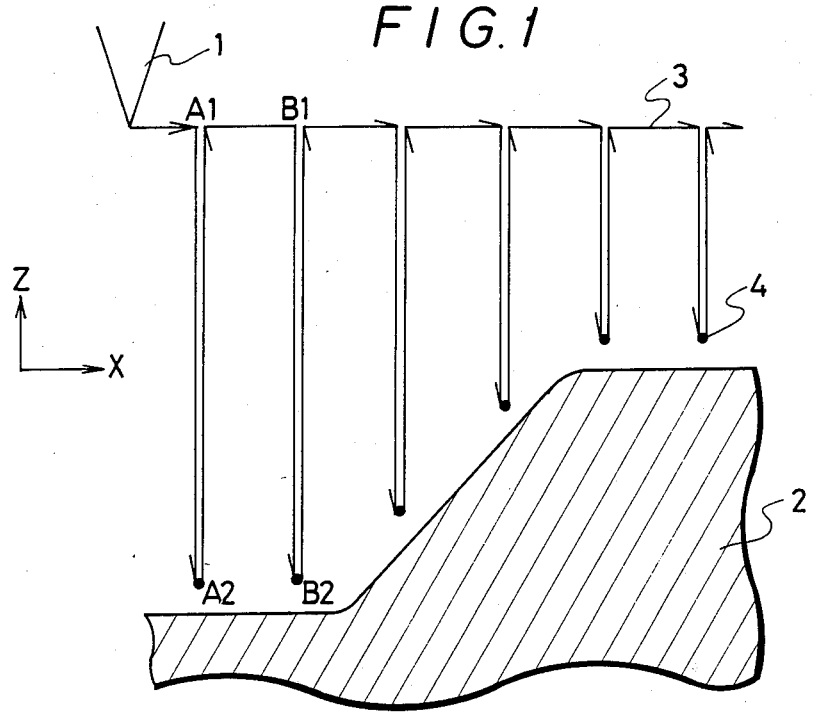
FIG. 1 is an explanatory view showing the movement of the probe according to the present invention.
Figure 2:
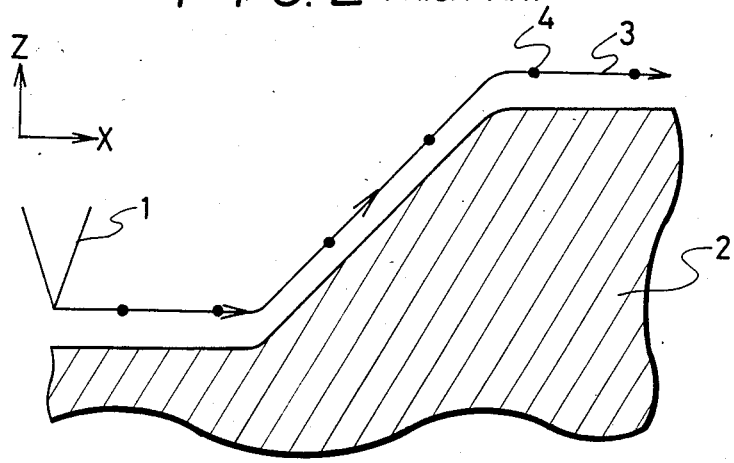
FIG. 2 is an explanatory view showing the movement of the probe according to the prior art.
Figure 3:
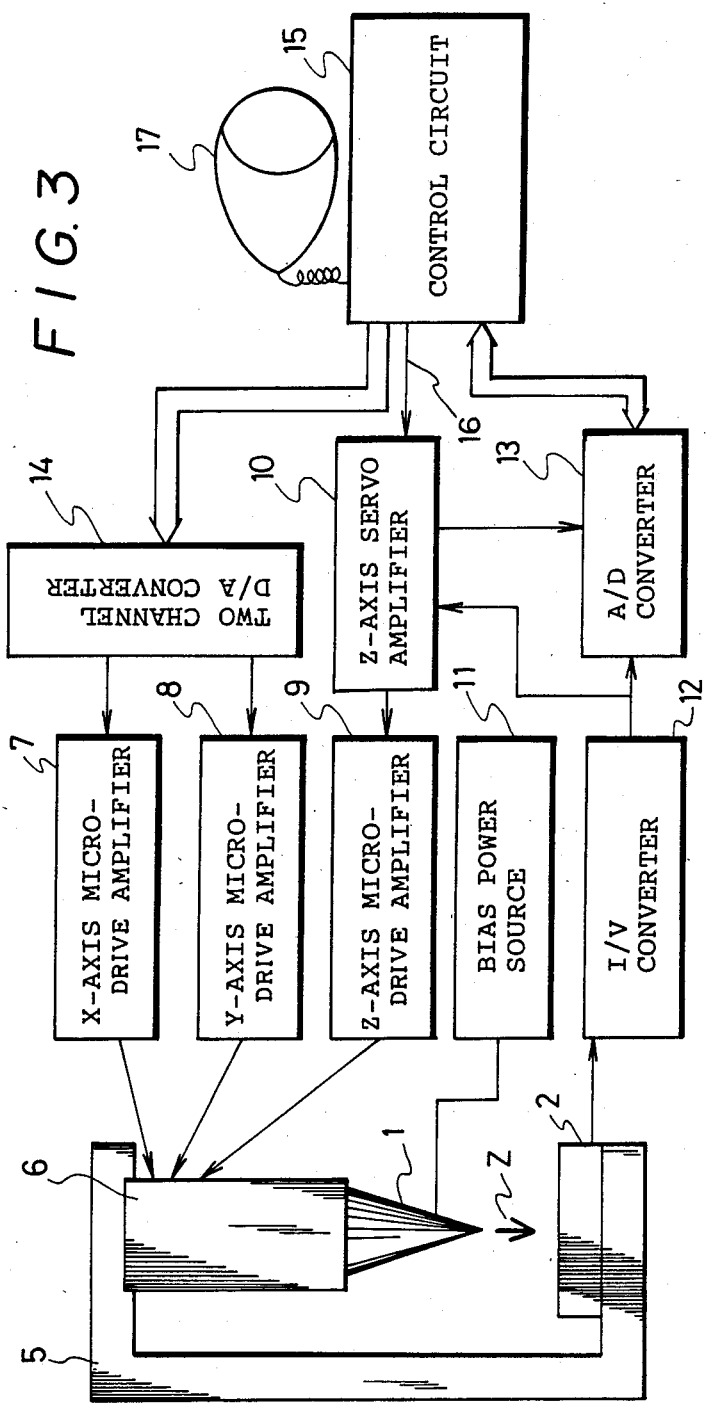
FIG. 3 is a schematic view of one embodiment of STM apparatus according to the present invention.

FIG. 1 shows an example of the operation of the detection probe according to the present invention, FIG. 3 shows an embodiment of the structure of the STM apparatus according to the present invention, and FIG. 4 is a flowchart illustrating one example of the measuring method by the STM according to the present invention.

One example of the measuring method by the STM according to the present invention is described with reference to FIG. 1. Let us assume, X is a direction of scanning across the surface of a material 2, Y is a direction parallel with the measured surface and perpendicular to the direction X, and Y is a direction perpendicular to the measured surface.

(1) A detection probe 1 is kept sufficiently far from the surface of a material 2 in comparison with the roughness of the material surface, and the detection probe 1 is moved at high speed in a scanning direction 3 to a point A1 above a measuring point.

(2) The probe 1 is then moved closer to and advanced toward the material 2 in the direction Z as far as a position A2 where a constant tunnel current flows.

(3) The displacement amount of the detection probe 1 in the direction Z at the measuring point A2 is measured.

(4) The detection probe 1 is then separated from the material Z and moved in the direction Z up to the point A1 above the measuring point, and is moved at high speed in the scanning direction 3 to a point B1 over the next measuring poit while an ample distance from the material in comparison with the roughness of the material surface is maintained. As shown in FIG. 1, the scanning movement of the probe 1 is carried out in a common plane, i.e., an XY plane.

By repeating the steps described above, a three-dimensional STM image of the surface of the material is produced based on the values taken at these measuring points.

One example of the structure of the STM apparatus according to the present invention and its operation are described with reference to FIG. 3.

Above a measuring point, a voltage is applied between a detection probe 1 and a material 2 by a bias power source 11. While a detection probe release signal 16 is being outputted from a control circuit 15, an I/V converter 12 outputs a voltage value corresponding to a value of tunnel current flowing between the detection probe 1 and the material 2 to a Z-axis servo amplifier and an A/D converter 13. When the output of the detection probe release signal 16 is stopped, the Z-axis servo amplifier 10 outputs a control signal to a Z-axis micro-drive amplifier 9 in order to maintain the tunnel current flowing between the detection probe 1 and the material 2 at a constant value. In response to the inputted control signal, the Z-axis micro-drive amplifier 9 drives a three-dimensional micro-drive mechanism 6 in the direction Z thereby shifting the detection probe 1 so that the value of tunnel current is maintained constant. The position of the detection probe 1 in the direction Z at this moment is outputted from the Z-axis servo amplifier 10 to the A/D converter 13, and an A/D converted value is inputted into the control circuit 15. Measurement at one measuring point is now completed. After completion of one measurement, the probe release signal 16 is outputted from the control circuit 15 to the Z-axis servo amplifier 10, the three-dimensional micro-drive mechanism 6 is driven in the direction Z so that the detection probe is moved away and separated from the material by a distance sufficient relative to the detection probe and is maintained far from the material in this manner, shift signals in the directions X and Y are outputted from the control circuit 15 to a 2-channel D/A converter 14, and then the 2-channel D/A converter 14 outputs D/A converted values to an X-axis micro-drive amplifier 7 and a Y-axis micro-drive amplifier 8. In response to the D/A converted shift signals, the X-axis micro-drive amplifier 7 and the Y-axis micro-drive amplifier 8 drive the three-dimensional micro-drive mechanism 6, thereby shifting the detection probe 1 in a scanning direction to a position above the next measuring point. The abovementioned steps are repeated, and values are measured at different measuring points. The set of measured values are inputted into the control circuit 15. The control circuit 15 produces an STM image on a display apparatus 17 based on these values. One example of the STM measuring method according to the present invention is described with reference to FIG. 4. S1, S2, S3, S4, S5 and S2' are operation-wise steps of the STM measurement.

S1 is a step in which the detection probe of the STM apparatus is moved away from the surface of a material far enough relative to the roughness or topography of the material surface.

S2 is a step in which at least one of the detection probe and the material is shifted to position the detection probe above the next measuring point.

S3 is a step in which a distance between the detection probe and the material is adjusted so that a constant tunnel current flows between the detection probe and the material.

S4 is a step in which measurement at a measuring point is carried out while the tunnel current flowing between the probe and the material is kept at a constant value.

S5 is a step in which the completion of measurement is determined.

S2' is a step in which at least one of the detection probe and the material is shifted to position the detection probe above a first measuring point. The steps are carried out in the following order. First, S1 and S2 are carried out, and then S3 and S4 are carried out. Unless the completion of measurement is determined in step S5, steps S1, S2, S3, S4 and S5 are repeated. When the completion of measurement is determined, the measurement is completed after step S1 is executed.

The STM measuring method according to the present invention produces the following effects.

(1) Since the separation between the detection probe and the surface of a material is made sufficiently large relative to the roughness of the surface at places other than the measuring points, measurement of a large surface area at high speed becomes possible without the detection probe colliding with the material surface.

(2) Measurement of a very rough surface at high speed is even possible without having the probe collide with the material surface because the separation between the detection probe and the material surface is made sufficiently large relative to the roughness of the material surface.

(3) Since operation of the micro-drive mechanism in the direction of the Z-axis can be stopped at placed other than measuring points, and no more than one vertical drive of the micro-drive mechanism at each measuring point is required, the drift which may be caused by heat generated in the micro-drive mechanism is reduced. The present invention provides an STM measuring method which effects high-speed and stable measurement of large and rough surfaces and thus has applicability to many industries.

We claim:

1. In a scanning tunneling microscope capable of controlling tunnel currents flowing between a probe and a material to be observed by changing the distance between the probe and the material, a method of measurement by scanning tunneling microscope wherein a plurality of measured values are obtained at plural measuring points by repeatedly carrying out the steps of: carrying out a measurement at a measuring point in a state in which a tunnel current flows between the probe and the material, separating the probe from the material sufficiently far relative to the roughness of the surface of the material to avoid collision therewith when the probe is scanned across the material surface, moving the probe to another measuring point, bringing the probe close to the material again at another measuring point, and carrying out another measurement in a state of which a tunnel current flows therebetween.

2. The method of measurement by scanning tunneling microscope defined in claim 1; further comprising the step of producing a scanning tunneling microscope image based on a plurality of measured values.

3. The method of measurement by scanning tunneling microscope defined in claim 1; further comprising the step of presenting the surface configuration of a material based on said plurality of measured values.

4. A method of measuring the surface topography of a material using a scanning tunneling microscope having a movable probe, comprising the steps of: advancing a probe of a scanning tunneling microscope relative to the surface of a material to a first measuring point in which a tunnel current flows between the probe and the material; carrying out a measurement at the first measuring point to obtain a measured value indicative of the surface topography of the material at the first measuring point; separating the probe relative to the material surface a sufficient distance to avoid collision between the probe and the surface of the material when the probe is scanned relative to the material surface; moving the probe in a scanning direction relative to the material surface; advancing the probe relative to the material surface to a second measuring point in which a tunnel current flows between the probe and the material; carrying out a measurement at the second measuring point to obtain a measured value indicative of the surface topography of the material at the second measuring point; and repeating the separating, moving, advancing and carrying out steps for other measuring points to obtain a set of measured values indicative of the surface topography of the material.

5. A method according to claim 4; wherein the advancing and separating steps at each measuring point are carried out in opposite directions to one another.

6. A method according to claim 4; wherein the separating steps comprise displacing the probe away from the material surface to a common plane which is a sufficient distance from the material surface to avoid collision of the probe with the surface of the material when the probe is scanned relative to the material surface.

7. A method according to claim 6; wherein the moving steps comprise moving the probe in a scanning direction in the common plane relative to the material surface.

8. A method according to claim 7; including the step of producing from the set of measured values an image representative of the surface topography of the material.

9. A method according to claim 4; including the step of producing from the set of measured values an image representative of the surface topography of the material.

10. A method according to claim 4; including the step of shifting the position of the probe relative to the material to maintain the value of tunnel current constant during the step of carrying out a measurement.

* * * * *